Mar. 3, 1925.
J. P. SCHUCKMAN
ANIMAL TRAP
Filed June 2, 1924
1,528,270
2 Sheets-Sheet 1
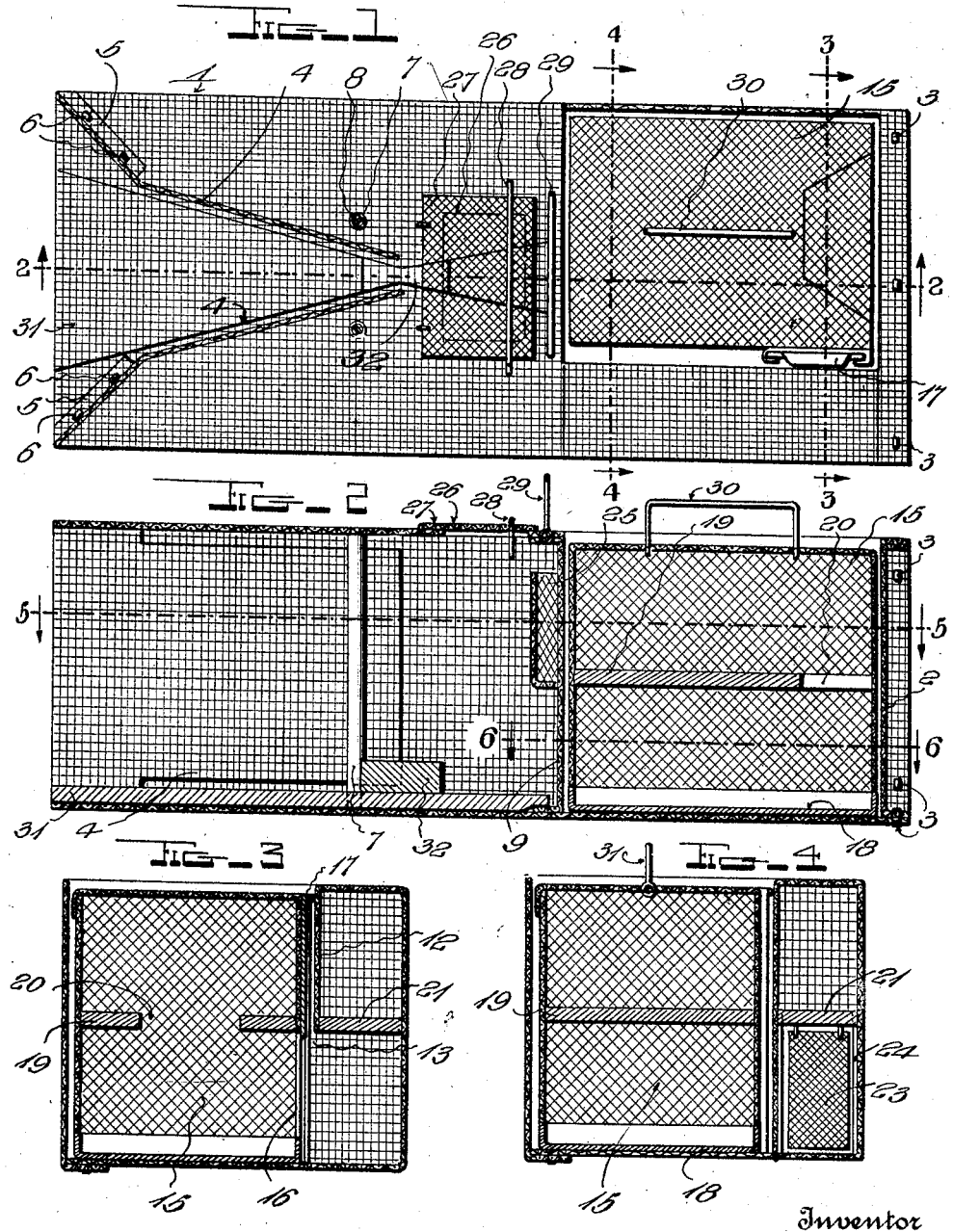

Mar. 3, 1925. 1,528,270
J. P. SCHUCKMAN
ANIMAL TRAP
Filed June 2, 1924   2 Sheets-Sheet 2
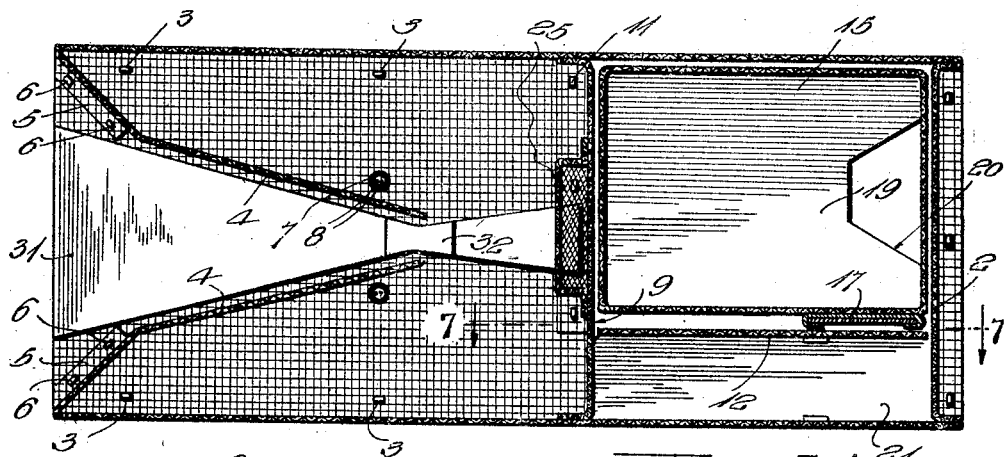
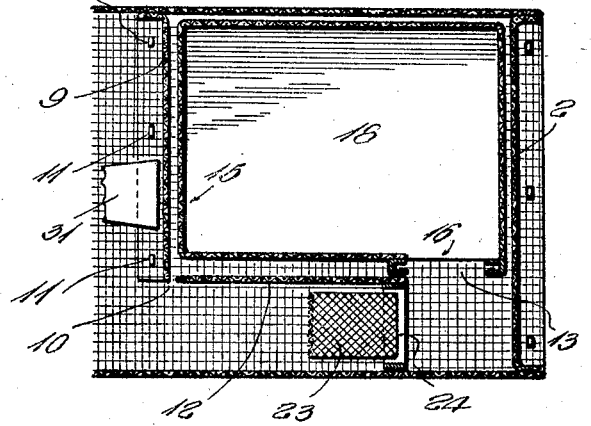
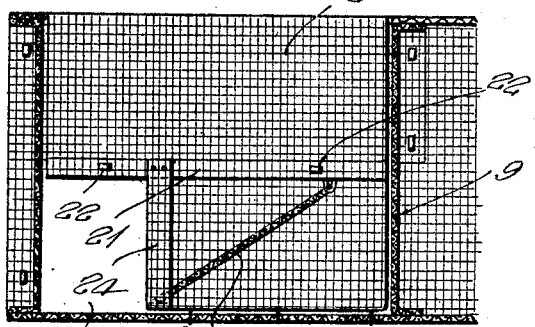
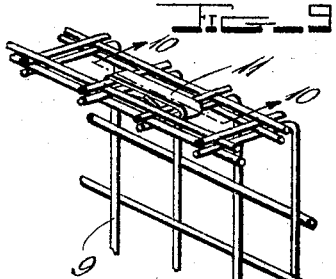
Inventor
John P. Schuckman
By H. B. Willson & Co.
Attorneys Patented Mar. 3, 1925.

1,528,270

UNITED STATES PATENT OFFICE.

JOHN P. SCHUCKMAN, OF WICHITA, KANSAS.

ANIMAL TRAP.

Application filed June 2, 1924. Serial No. 717,339.

*To all whom it may concern:*

Be it known that I, JOHN P. SCHUCKMAN, a citizen of the United States, residing at Wichita, in the county of Sedgwick and State of Kansas, have invented certain new and useful Improvements in Animal Traps; and I do declare the following to be a full, clear, and exact description of the invention, such as will enable others skilled in the art to which it appertains to make and use the same.

My invention relates to improvements in traps designed primarily for catching rats, and one of the principal objects of the invention is to provide an improved form of sanitary rat trap which is of more simple construction than, yet is equally advantageous as the traps shown by my prior Patents Nos. 1,255,798 and 1,461,681.

With the foregoing in view, the invention resides in the novel subject matter hereinafter described and claimed, the description being supplemented by the accompanying drawings.

Figure 1 is a top plan view.

Figures 2, 3 and 4 are sectional views as indicated by lines 2—2, 3—3 and 4—4 of Fig. 1.

Figures 5 and 6 are horizontal sectional views on lines 5—5 and 6—6 of Fig. 2.

Figure 7 is a detail longitudinal sectional view on line 7—7 of Fig. 5.

Figure 8 is a detail vertical section partly in elevation showing one of the vertical tubes which limit the outward springing of a pair of resilient, converging walls at the inlet of the trap cage.

Figure 9 is a sectional perspective view showing the manner of securing a transverse partition, hereinafter described, within the cage.

Figure 10 is a detail vertical sectional view as indicated by line 10—10 of Fig. 9.

In the drawings above briefly described, the numeral 1 designates a rectangular cage preferably formed of woven galvanized wire, said cage being entirely open at its front end, while its rear end is closed by a wall 2 whose edges are preferably bent outwardly and secured against the inner sides of the cage top, bottom and side walls, by strips of metal 3, passed through the meshes of the wire and having their ends bent against each other.

A pair of woven wire walls 4 converge inwardly from the open end of the cake 1 and at their outer ends, these walls are in abutting relation with the side walls of said cage, while the inner ends of said walls are spaced comparatively slight distances apart, as shown in Fig. 1. The outer end portions of the walls 4, have their upper and lower edges bent outwardly to provide flanges 5 secured by suitable clips 6, such as those above indicated at 3 to the top and the bottom of the cage. From the flanges 5 to the inner ends of the walls 4, the latter are free of contact with the cage, so that a rat or other animal may readily force his way inwardly between said walls, the latter then springing outwardly.

Spaced outwardly from the inner end portions of the walls 4, are two vertical tubes 7 whose ends abut the top and bottom of the cage 1 and prevent them from being bent inwardly and interfering with proper movement of said walls. Pieces of wire 8 are passed through the tubes 7 and connected with the meshes of the cage top and bottom, as shown most clearly in Fig. 8. These pieces of wire tie the top and bottom of the cage against spreading and they also hold the tubes 7 in place so that they will limit the outward movement of the walls 4, and the latter can not therefore be manually forced outwardly to an extent to impair the resiliency which always returns them to the position of Fig. 1, after an animal has entered the trap.

A vertical transverse wire partition 9 is secured in the cage 1 in rearwardly spaced relation to the walls 4, this partition being formed with a door opening 10 adjacent one vertical side wall of said cage. Preferably, the edges of the partition 9 are bent laterally and connected with the walls of the cage 1 by clips 11. A vertical longitudinal partition 12 extends from the partition 9 to the rear end wall 2 of the cage and from the top to the bottom of said cage, said partition being disposed at the inner edge of the door opening 10. Adjacent its rear end, this partition is also formed with a door opening indicated at 13. To form this partition and at the same time to provide a rectangular opening in the top of the cage 1, the cage top is preferably cut on two parallel transverse lines adjacent the partition 9 and the end wall 2 and on one longitudinal line extending along the upper edge of one vertical side wall of the cage, and the wire within these lines is bent downwardly. This wire forms the partition 12 which may be secured to the cage bottom in any suitable manner, as indicated at 14, for instance by bending certain wires at the lower edge of the partition, around the meshes of the cage bottom.

Insertable and removable through the above described opening in the top of the cage 1, is an auxiliary cage 15 which extends from the partition 9 to the rear end wall 2 and from the partition 12 to the side wall of the cage 1 remote therefrom. This cage 15 is formed with a door opening 16 normally registering with the opening 13 and is provided with a vertically slidable door 17, by means of which said opening 16 may be closed. The cage 15 is preferably equipped with a solid sheet metal bottom 18 and is divided horizontally, above this bottom by a wooden floor 19 having a notch 20 in one end. Any rats or the like entering the cage 15, will climb almost immediately through the notch 20 onto the wooden floor 19, as they much prefer to stand on wood instead of metal. Thus, the lower portion of the cage 15 is always clear to receive another animal caught in the trap.

Extending between the partition 9 and the rear end wall 2 of the cage 1, and also from the longitudinal partition 12 to the adjacent vertical side wall of said cage, is a horizontal partition 21 which may well be formed of wood and secured to said vertical side wall and the partition 12, by staples 22 (Fig. 7). This horizontal partition carries a pivoted one-way gate 23 which is located between the door openings 10 and 13, and said partition preferably carries a U-shaped metal strap 24 which engages the bottom of the cage 1, one side wall of the latter, and the partition 12 preventing said partition and side wall from being bent inwardly and interfering with proper actuation of the gate. The edges of the metal strip 24 are preferably bent or corrugated sufficiently to stiffen them against easy bending.

A suitable bait container 25 is carried by the partition 9 and is accessible through an opening in the top of the cage 1, which opening is indicated at 26. This opening is normally closed by a door 27 which is provided with an appropriate latch 28. The part 29 shown adjacent one end of the door 27, in Figs. 1 and 2, is a carrying handle for the entire trap. A similar handle 30 is provided on the auxiliary cage 15.

A strip of wood 31 preferably rests on the bottom of the cage 1, between the walls 4 and extends inwardly therefrom to the partition 9, it having been found that rats will enter the trap more readily if they walk upon wood instead of upon metal. The upper side of the strip 31 may well carry a block 32 which prevents any trapped rat from forcing either of the walls 4 toward the other to an excessive extent, which might permit one to catch on the other.

By providing the construction shown and described or a substantial equivalent thereof, a comparatively simple and inexpensive trap is provided, yet one which will be exceptionally efficient and sanitary. When the trap is baited and the door 17 stands in its raised position, the device is in readiness for operation. Any rat or other animal for which the trap is set, when seeking the bait in the holder 25, will wedge its way inwardly through the walls 4, but if he attempts to back out between these walls, the wires at the inner ends of the latter will prod him and thus prevent exit. When the entrapped animal finds that he is caged and cannot reach the bait, he seeks to leave the cage by passing along the "tunnel", under the horizontal partition 21, and he raises the gate 23 and enters the auxiliary cage 15 through the registering doors 13 and 16. Once in this cage, he will climb to the elevated floor 19 and in a great majority of instances, will remain at this point. When any number of rats or the like have been trapped in the cage 15, the door 17 may be closed and said cage removed and immersed in water to drown the prey. When the dead animals are removed, and the door 17 left open, the cage 15 is reinserted into the cage 1 and the trap is in readiness for further use.

On account of the excellent results which have been obtained from the details disclosed, these details are preferably followed, but within the scope of the invention as claimed, numerous minor changes may be made.

I claim:

1. A trap comprising a woven wire cage having an open end, a pair of vertical woven wire walls converging inwardly from said open end of the cage and having their outer ends in abutting relation with opposed vertical side walls of the cage while their inner ends are horizontally spaced, the outer end portions of said converging walls having lateral horizontal flanges contacting with and secured to the top and bottom of the cage to anchor said converging walls and to hold the top and bottom of the cage against spreading, the upper and lower edges of said converging walls being spaced from said top and bottom of the cage from said flanges to their inner extremities to permit them to be sprung freely outward by a rat or other animal entering the trap, a pair of vertical tubes spaced outwardly from the inner end portions of said converging walls to limit the outward movement thereof, the ends of said tubes abutting the top and bottom of the cage to prevent them from moving inwardly against and interfering with operation of said converging walls, and wires passing through said tubes and connected with the cage top and bottom to tie said top and bottom against spreading and to retain said tubes in place.

2. A trap comprising a woven wire cage having an inlet, a pair of spring walls converging inwardly therefrom, and a pair of vertical tubes at the outer side of said walls to limit their outward movement, said tubes abutting the top and bottom of the cage to prevent them from moving inwardly and interfering with operation of said walls, and wires passing through said tubes and connected with the top and bottom of the cage to hold said tubes in place and to tie said top and bottom against spreading.

In testimony whereof I have hereunto affixed my signature.

JOHN P. SCHUCKMAN.